United States Patent
Islam et al.

(10) Patent No.: US 10,769,695 B2
(45) Date of Patent: Sep. 8, 2020

(54) GENERATING TITLES FOR A STRUCTURED BROWSE PAGE

(71) Applicant: eBay Inc., San Jose, CA (US)

(72) Inventors: Atiq Islam, San Jose, CA (US); Ganesh Talele, Milpitas, CA (US)

(73) Assignee: eBay Inc., San Jose, CA (US)

( * ) Notice: Subject to any disclaimer, the term of this patent is extended or adjusted under 35 U.S.C. 154(b) by 735 days.

(21) Appl. No.: 14/843,576

(22) Filed: Sep. 2, 2015

(65) Prior Publication Data

US 2017/0061517 A1 Mar. 2, 2017

(51) Int. Cl.
*G06Q 30/00* (2012.01)
*G06Q 30/06* (2012.01)
*G06F 16/957* (2019.01)
*G06F 40/258* (2020.01)

(52) U.S. Cl.
CPC ..... *G06Q 30/0625* (2013.01); *G06F 16/9577* (2019.01); *G06F 40/258* (2020.01)

(58) Field of Classification Search
CPC .................... G06Q 30/0625; G06Q 30/06–08
USPC ..................................... 705/26.62, 26.1–27.2
See application file for complete search history.

(56) References Cited

U.S. PATENT DOCUMENTS

| | | | | |
|---|---|---|---|---|
| 6,085,193 | A * | 7/2000 | Malkin | H04L 29/06 |
| 7,814,089 | B1 * | 10/2010 | Skrenta | G06F 16/951 707/709 |
| 7,870,031 | B2 * | 1/2011 | Bolivar | G06Q 30/02 705/26.1 |
| 8,001,105 | B2 * | 8/2011 | Bolivar | G06Q 30/02 707/709 |
| 8,346,754 | B2 | 1/2013 | Ravikumar et al. | |
| 8,458,194 | B1 | 6/2013 | Procopio | |
| 8,504,567 | B2 * | 8/2013 | Billawala | G06F 17/30716 707/736 |
| 9,767,204 | B1 * | 9/2017 | Hoover | G06F 17/30867 |
| 9,767,417 | B1 * | 9/2017 | Hoover | G06N 7/02 |
| 2008/0104054 | A1 | 5/2008 | Spangler | |
| 2008/0120292 | A1 * | 5/2008 | Sundaresan | G06F 16/355 |
| 2009/0049478 | A1 | 2/2009 | Kwan | |
| 2010/0064254 | A1 * | 3/2010 | Atsmon | G06Q 30/0603 715/810 |
| 2010/0082410 | A1 * | 4/2010 | Baudin | G06Q 30/0201 705/7.29 |
| 2010/0235351 | A1 * | 9/2010 | Iwasa | H04N 7/17318 707/723 |
| 2011/0106851 | A1 | 5/2011 | Swartz | |
| 2012/0078721 | A1 * | 3/2012 | Dakka | G06Q 30/0241 705/14.55 |
| 2015/0052143 | A1 | 2/2015 | Liu et al. | |

* cited by examiner

*Primary Examiner* — Ethan D Civan

(74) *Attorney, Agent, or Firm* — Newport IP, LLC

(57) ABSTRACT

Example embodiments described herein disclose a specially configured device to generate and cause display of human readable titles for browse pages. The token based title system may be or include a group of one or more server machines. A user device may accordingly receive a search query and set of structured data elements (e.g., filter attributes), create a browse node based on the content of the search query and the structured data elements, access published content (e.g., an item inventory) based on the browse node, and generate a human readable page title to be displayed as a title of a browse page.

16 Claims, 8 Drawing Sheets

GENERATING TITLES FOR A STRUCTURED BROWSE PAGE

TECHNICAL FIELD

Embodiments of the present disclosure relate generally to data processing and, more particularly, but not by way of limitation, to selecting tokens and generating titles for structured browse pages based on the selected tokens.

BACKGROUND

Systems and methods for searching for and presenting available data on the Internet are well known. Network based content publishers index and curate hundreds of thousands to millions of pages based on structured data associated with the pages. Individuals may therefore search for, and be presented with, published online content in organized browse pages. A challenge associated with creating such organized browse pages is generating relevant page titles for each of the potentially millions of browse pages.

Conventionally, network based content publishers may have associated page titles which are linked to particular browse pages, or alternatively, may simply display queries along with structured data as a page title.

BRIEF DESCRIPTION OF THE DRAWINGS

Various ones of the appended drawings merely illustrate example embodiments of the present disclosure and cannot be considered as limiting its scope.

Figure 1:
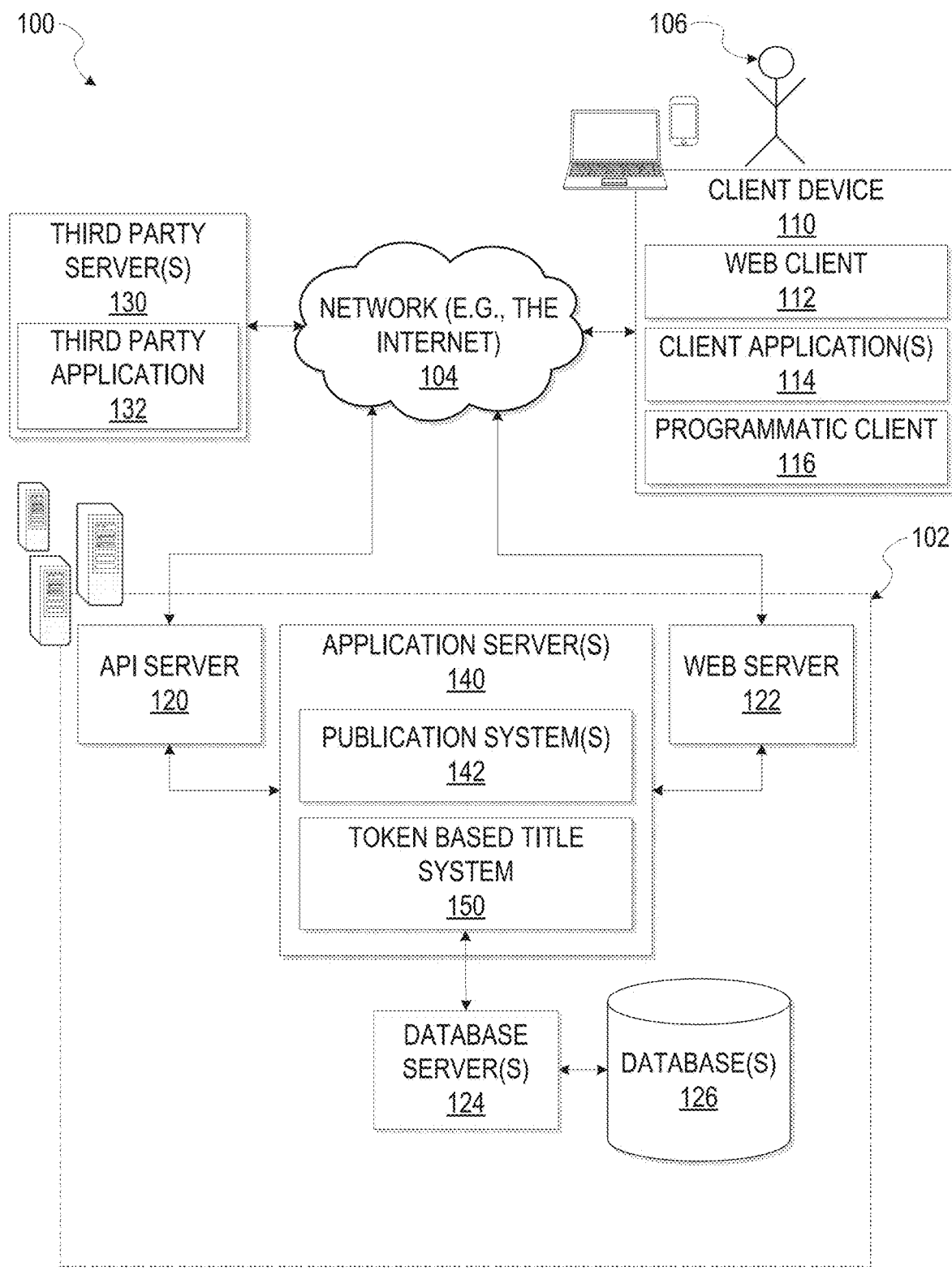
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example embodiments described herein disclose a specially configured device to generate and cause display of human readable titles for browse pages. The token based title system may be or include a group of one or more server machines. A server may accordingly receive a search query and set of structured data elements (e.g., filter attributes), create a browse node (e.g., a collection of item listings) based on the content of the search query and the structured data elements, access published content (e.g., an item inventory) based on the content of the browse node, and generate a human readable page title to be displayed as a title of a browse page. Examples merely typify possible variations. Unless stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

According to various embodiments, the token based title system is configured to generate a human-readable title based on a determined pairwise order of tokens. A token is a single data element representing a single word or phrase. Tokens include, for example, individual query terms which make up a search query, user selectable filter attributes (e.g., structured data elements), and individual words and phrase which comprise listing titles. The tokens may be retrieved from search queries, or item listing titles within an inventory of items. For example, a parser located within the modules of the token based title system may receive a search query comprising a set of tokens, and parse the search query into a set of one or more tokens. Upon parsing the query into a set of token, a pairwise order of the tokens may be determined. The pairwise order of the tokens are the positions of the tokens relative to one another in a listing title. The pairwise order of the tokens may be determined based on a pairwise comparison of similar token pairs within listing titles. A pairwise comparison is the process of comparing entities in pairs to judge which of each entity is preferred, or has a greater amount of some quantitative property; here, the pairwise comparison may serve to determine a preferential sequence of tokens relative to one another to produce a meaningful, syntactically correct, human readable title.

In some embodiments, the token based title system may access an inventory of items that includes at least some of the set of tokens within the browse node within their respective listing titles. The token based title system may apply a pairwise comparison of the tokens of the listing titles in order to determine a preferential, human readable sorting of each token relative to one another (e.g., the pairwise order). Thus, by comparing a pairwise order of similar tokens from each listing title, a preferred pairwise order of tokens may be determined.

In some embodiments, the token based title system may weigh each item listing based on one or more quality factors and assign the weight to the corresponding pairwise order of tokens within the listing title of the item listing. The one or more quality factors include, for example, a view count associated with the item listing, a reputation score associated with an author of the item listing, and a sales volume associated with the item listing. The weight of the item listing may then be applied in the pairwise comparison to determine a preferential sorting of tokens.

In some embodiments, executing the pairwise comparison of tokens includes assigning signs (e.g., positive and negative) to weights of token pairs from listing titles and calculating a sum of the corresponding weights of similar token pairs. For example, a first item listing from among the inventory of items includes a first pairwise order of sequential tokens, Token A and Token B, and a first weight based on the one or more quality factors. The first pairwise order may indicate, for example, that Token A and Token B should be in alphabetical order, with Token A appearing before Token B. A second item listing from among the inventory of items, however, may include a second pairwise order of sequential tokens, Token B and Token A, as well as a corresponding second weight based on the one or more quality factors. The second pairwise order may indicate that Token B and Token A should be in reverse alphabetical order, with Token B appearing before Token A.

To execute the pairwise comparison and determine a preferred pairwise order of a human readable title, the token based title system may assign a positive sign to the weight of the alphabetical pairwise order (e.g., the first weight of the first pairwise order), and a negative sign to the weight of the reverse-alphabetical pairwise order (e.g., the second weight of the second pairwise order). Having assigned signs to the pairwise orders, the token based title system may then take a sum of the weights of the pairwise orders of Token A and Token B from among the listing titles of the item listings. The token based title system may then determine a preferential pairwise order of the tokens based on the sign of the sum. For example, if the sign of the sum is positive, then the preferred pairwise order of the tokens is the alphabetical sorting (e.g., the first pairwise order), while if the sign of the sum is negative, then the preferred pairwise order of the tokens is the reverse-alphabetical sorting (e.g., the second pairwise order).

Upon determining a preferred pairwise order of each token comprising the browse node relative to one another, the token based title system generates a human readable title.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but is not limited to, a mobile phone, desktop computer, laptop, personal digital assistant (PDA), smart phone, tablet, ultra book, netbook, laptop, multi-processor systems, microprocessor-based or programmable consumer electronic, game console, set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. While the publication system 142 is shown in FIG. 1 to form part of the networked system 102, it will be appreciated that, in alternative embodiments, the system 142 may form part of a payment service that is separate and distinct from the networked system 102.

A token based title system 150 may provide functionality operable to perform various operations to generate a human readable title based on a determined pairwise order of tokens. For example, the token based title system 150 may receive a set of tokens (e.g., a search query and user selected filter attributes) from a client device 110, and based on the tokens, create a browse node. The token based title system 150 may then access an item inventory from the databases 126, the third party servers 130, the publication system 142, and other sources, based on the browse node, wherein the item inventory comprises item listings with corresponding listing titles and wherein the listing titles include at least some of the tokens of the browse node. In some example embodiments, the token based title system 150 may apply a pairwise comparison of the tokens within the listing titles in order to determine a preferential pairwise order of tokens.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication systems 142 and token based title system 150 could also be implemented as standalone software programs, which do not necessarily have networking capabilities.

The web client 112 may access the various publication systems 142 via the web interface supported by the web server 122. Similarly, the programmatic client 116 accesses the various services and functions provided by the publication systems 142 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
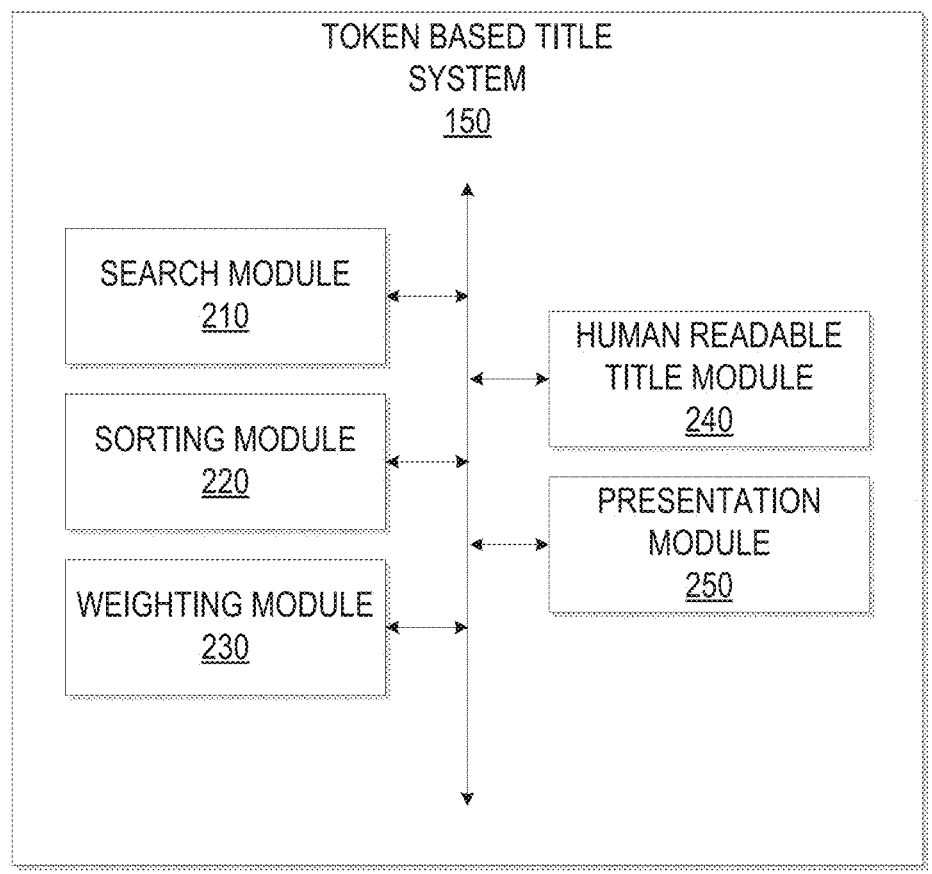
FIG. 2 is a block diagram illustrating components of a token based title system suitable for generating human readable titles, according to some example embodiments.

FIG. 2 is a block diagram illustrating components of the token based title system 150 that configure the token based title system 150 to receive a set of tokens, generate a browse node, determine a preferential pairwise order of tokens, and generate a human readable title. The token based title system 150 is shown as including a search module 210, a sorting module 220, a weighting module 230, a human readable title module 240, and a presentation module 250, all configured to communicate with each other (e.g., via a bus, shared memory, or a switch). Any one or more of these modules may be implemented using one or more processors and hence may include one or more processors (e.g., by configuring such one or more processors to perform functions described for that module).

Any of the module discussed above may be implemented using hardware alone (e.g., one or more processors), or a combination of hardware and software. For example, any module described of the token based title system 150 may physically include an arrangement of one or more processors configured to perform operations described herein for that module. As another example, any module of the token based title system 150 may include software, hardware, or both, that configure an arrangement of one or more processors to perform the operations described herein for that module. Accordingly, different modules of the token based title system 150 may include and configure different arrangements of such processors or a single arrangement of such processors at different points in time. Moreover, any two or more modules of the token based title system 150 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The search module 210 is configured to receive queries and user selected filter attributes, generate browse nodes based on the queries and user selected filter attributes, access an item inventory, and retrieve a set of search results based on the browse node. For example, the search module 210 may receive queries as text strings and filter attributes as user selections via a graphical user interface at client device 110. The search module 210 generates a browse node based on the tokens of the queries and the filter attributes and retrieves a set of search results from among an inventory of items based on the browse node.

The sorting module 220 is configured to perform a pairwise comparison of similar token pairs within listing titles. The pairwise comparison may include operations to analyze the item inventory accessed by the search module 210, identify individual tokens within the listing titles of the items comprising the item inventory, and determine a pairwise order of the tokens based on the pairwise comparison. For example, the sorting module 220 may first identify a set of tokens within the browse node generated by the search module 210 and retrieve listing titles from the item inventory which include at least some of the set of tokens identified. The sorting module 220 may then apply a pairwise comparison to the tokens within the listing titles in order to determine a preferred pairwise order.

The weighting module 230 is configured to access the item inventory retrieved by the search module 210 and determine a weight of each item listing based on one or more quality factors. The quality factors may include, for example, a view count of the item listing, a reputation score of an author of the listing, and a sales volume associated with the item listing. In some embodiments, the weights determined by the weighting module 230 may be transmitted to the sorting module 220 in order to apply the listing weights to the pairwise comparison.

The human readable title module 240 is configured to receive the preferred pairwise order determined by the sorting module 220 and to generate a human readable title based on at least the set of tokens comprising the browse node, and the preferred pairwise order. The human readable title module 240 may transmit the human readable title to the presentation module 250 to display at a client device (e.g., client device 110).

Figure 3:
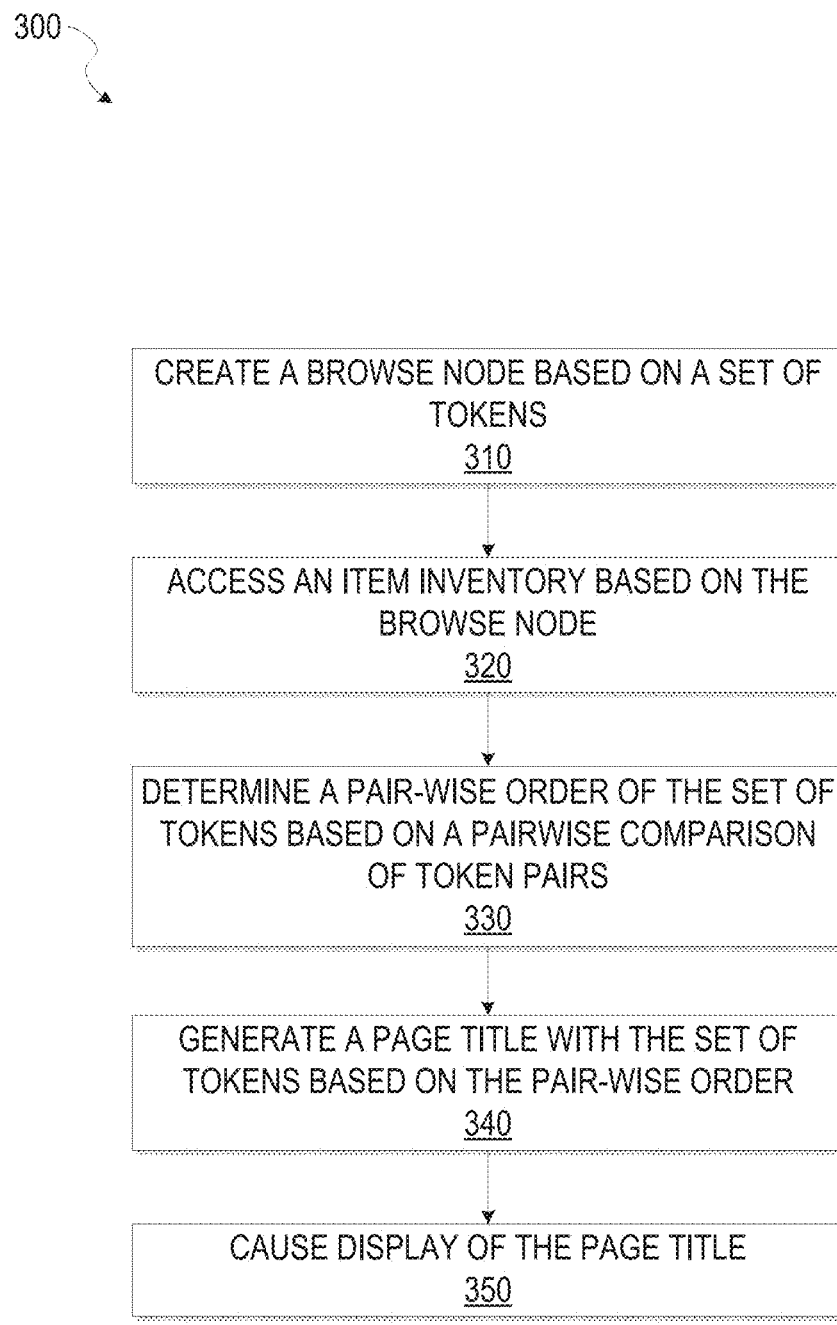
FIG. 3 is a flowchart illustrating operations of the token based title system in performing a method of generating and displaying a human readable page title, according to some example embodiments.

FIG. 3 is a flowchart illustrating operations of the token based title system 150 in performing a method 300 of generating and displaying a human readable page title, according to some example embodiments. Operations of the method 300 may be performed by the modules described above with respect to FIG. 2. As shown in FIG. 3, the method 300 may include operations 310, 320, 330, 340, and 350.

In operation 310, the search module 210 creates a browse node based on a set of one or more tokens. The tokens may include individual words and phrases received as a query, as well as user selected filter attributes. In some embodiments, the search module 210 receives the query and filter attribute selections as user inputs via a graphical user interface on a client device (e.g., client device 110).

In operation 320, the search module 210 accesses an item inventory based on the set of tokens comprising the browse node. The item inventory may include one or more item listings including listing titles. The listing titles of the item listings may include at least some of the set of tokens of the browse node. In some embodiments, the search module 210 gathers the relevant item listings (e.g., based on the tokens) and transmits the relevant item listings to the sorting module 220 to determine a pairwise order of the tokens.

In operation 330, the sorting module 220 performs a pairwise comparison of similar token pairs in order to determine a preferred pairwise order of the tokens. To determine a pairwise order of tokens, the sorting module 220 retrieves the listing titles of the item listings within the item inventory and identifies sequential sets of tokens within the listing titles (e.g., the set of tokens). The tokens include at least those tokens identified within the set of tokens comprising the browse node. Having identified sequential sets of tokens, the sorting module 220 executes a pairwise comparison in order to determine a preferred pairwise order.

In operation 340, the human readable title module 240 receives the preferred pairwise order determined by the sorting module 220, and the set of tokens received by the search module 210, and generates a human readable title. The human readable title may include all or some of the set of tokens and may also include additional tokens to improve syntax and readability. At operation 350, the presentation module 250 receives and causes display of the human readable title at a client device (e.g., client device 110).

Figure 4:
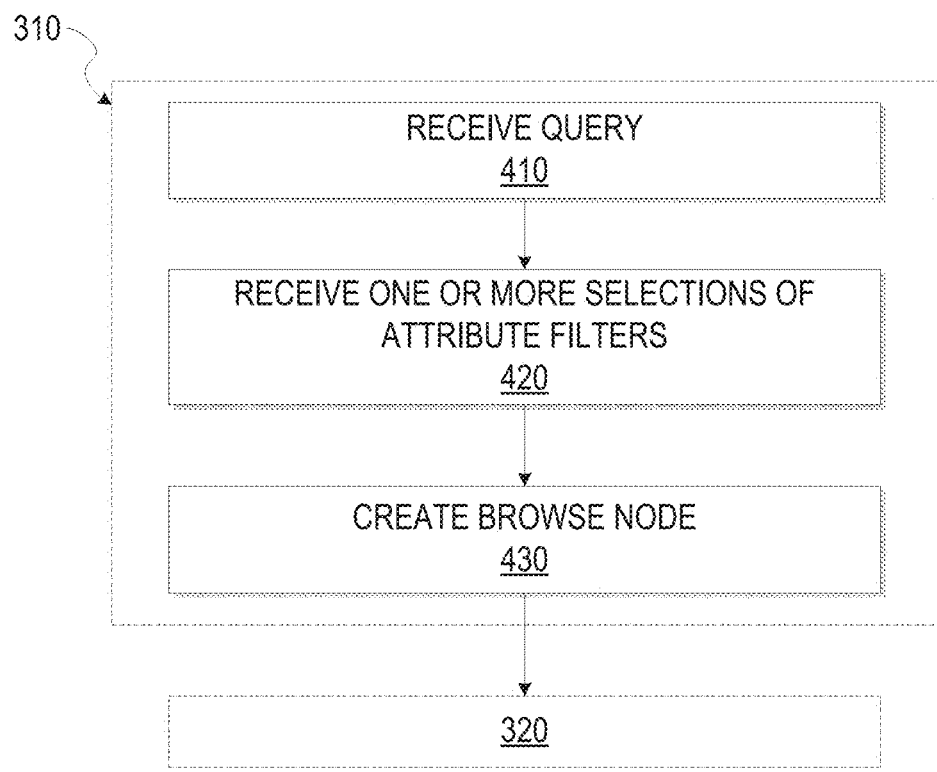
FIG. 4 is a flowchart illustrating operations of the token based title system in performing a method of creating a browse node, according to some example embodiments.

FIG. 4 is a flowchart illustrating operations of the token based title system 150 in performing operation 310 of FIG. 3 for creating a browse node, according to some example embodiments. As shown in FIG. 4, operation 310 of FIG. 3 may include sub-operations 410, 420, and 430.

In operation 410, the search module 210 receives a search query as a user input at a client device (e.g., client device 110). The search queries include text strings comprising words or phrases. In operation 420, the search module 210 receives one or more selections of attribute filters (e.g., structured data) from a client device (e.g., client device 110).

In operation 430, the search module 210 identifies a set of tokens from the search query and the selection of attribute filters. The tokens include the individual words and phrases of the query, as well as the attributes represented by the user selected attribute filters. The search module 210 then generates a browse node based on the identified tokens. Having generated a browse node, the search module 210 proceeds to operation 320 (e.g., of FIG. 3) to retrieve a set of search results.

Figure 5:
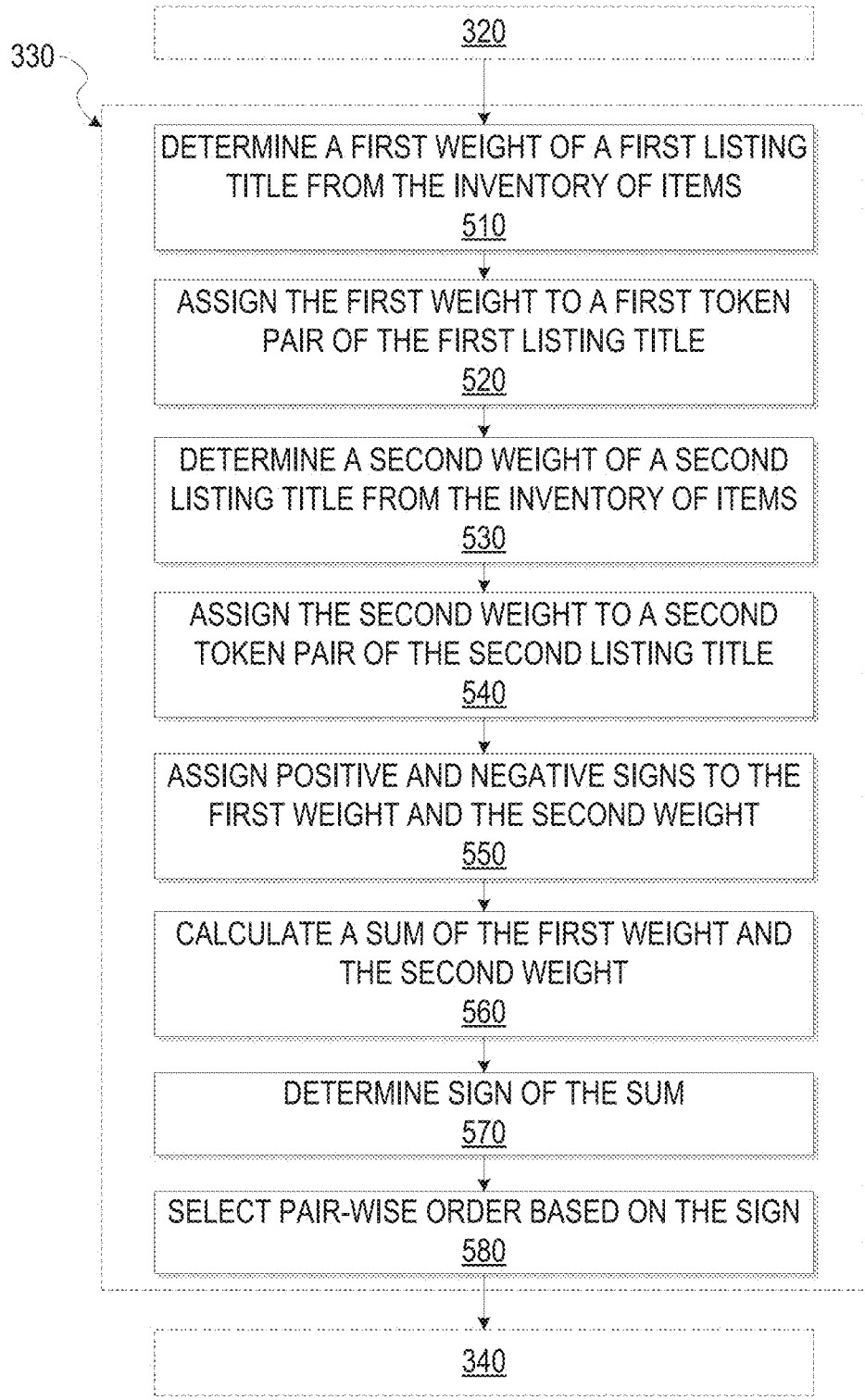
FIG. 5 is a flowchart illustrating operations of the token based title system in performing a method of determining a pairwise order, according to some example embodiments.

FIG. 5 is a flowchart illustrating operations of the token based title system 150 in performing operation 330 of FIG. 3 for determining a preferred pairwise order by executing a pairwise comparison of tokens, according to some example embodiments. As shown in FIG. 5, operation 330 of FIG. 3 may include sub-operations 510, 520, 530, 540, 550, 560, 570, and 580.

At operation 510, the weighting module 230 determines a weight of a first listing title of a first item listing from among the inventory of items. In some embodiments, the weight of the listing title may be based on one or more quality factors, including, for example, a view count of the first item listing, a reputation score of an author of the first item listing, and sales volume associated with the first item listing. The weight of the first listing title may increase as the values of the quality factors increase. For example, as a view count of a first item listing increases, the weight of the first listing title may also increase relative to its view count. At operation 520, having determined a weight of a first listing title of a first item listing from among the item inventory (e.g., the first weight), the weighting module 230 assigns the first weight to a first token pair from the first listing title.

At operation 530, the weighting module 230 determines a weight of a second listing title of a second item listing from among the inventory of items (e.g., a second weight). As discussed above, the weight may be based on one or more quality factors associated with the second item listing. At operation 540, the weighting module 230 assigns the second weight to a second token pair from the second listing title, wherein the second listing pair includes similar tokens to the first token pair, but with an opposite pairwise order.

At operation 550, having assigned weights to token pairs from the first and second listing titles, the weighting module 230 assigns signs to the token pairs. In some embodiments, the weighting module 230 assigns positive signs to token pairs having an alphabetical sorting and negative signs to token pairs having a reverse alphabetical sorting.

At operation 560, the weighting module 230 calculates a sum of the first token pair and the second token pair. At operation 570, having calculated the sum, the sorting module 220 determines a sign of the sum. A positive sign would indicate that the sum of all positive token pairs (e.g., the first token pair) is greater than the absolute value of the sum of all negative token pairs (e.g., the second token pair), suggesting that the pairwise order of the first token pair is preferred. At operation 580, the sorting module 220 selects the pairwise order based on the sign of the sum.

Figure 6:
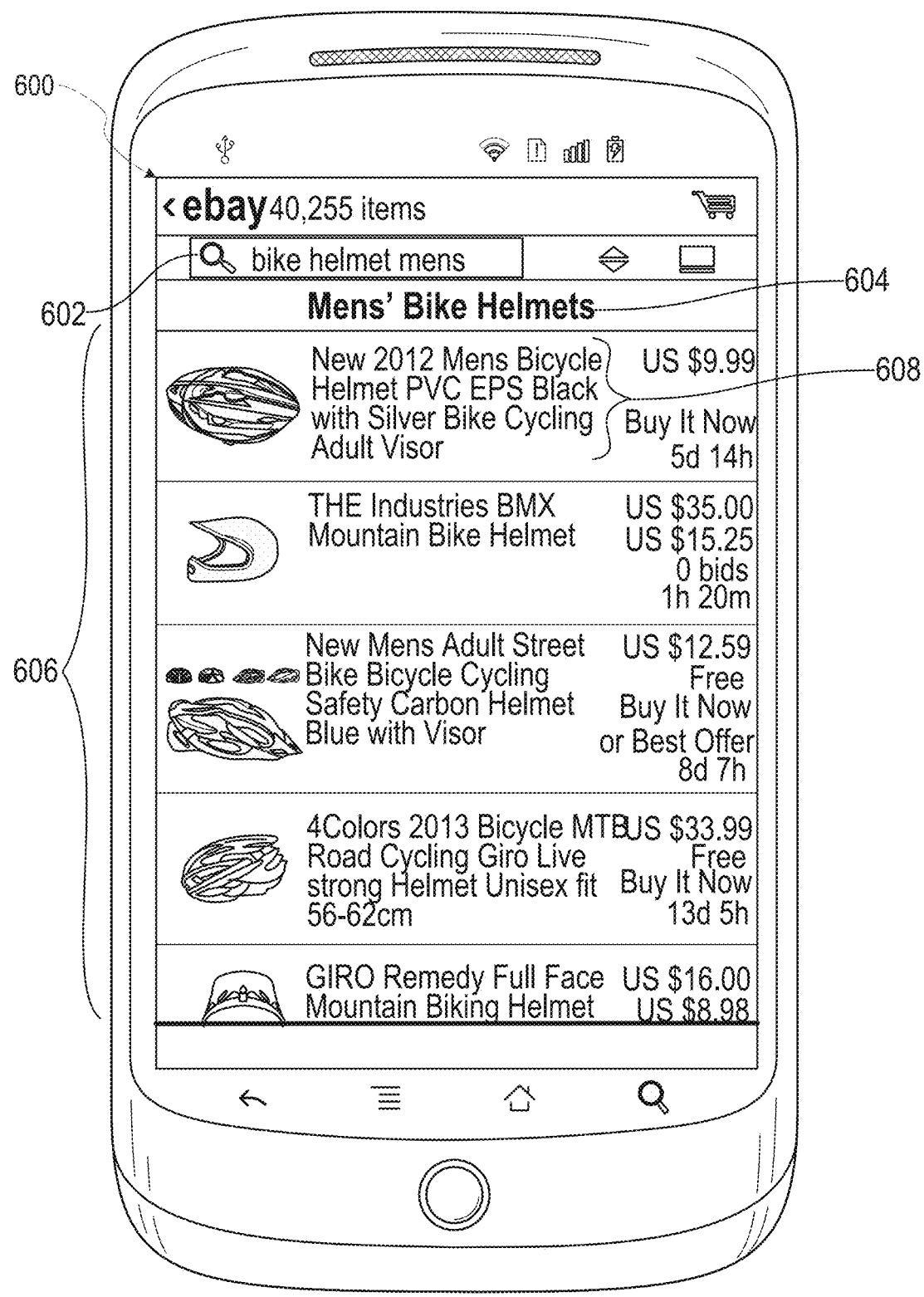
FIG. 6 is a diagram illustrating a graphical user interface including a browse page and a human readable title, according to some example embodiments.

FIG. 6 is a diagram illustrating a graphical user interface 600 including a search query 602, a human readable title 604, and a set of search results 606 with corresponding listing titles (e.g., listing title 608), according to some example embodiments.

The query 602 is depicted as a set of tokens, "bike helmet mens," where each word within the query represents an individual token. In some embodiments, the graphical user interface 600 may also include a list of user selectable filter attributes (e.g., structured data), which the user may select to further refine the query. The human readable title 604 is depicted to include all of the tokens found in the query 602, reordered based on the determined pairwise order. To generate the human readable title 604, the token based title system 150 accesses an item inventory (e.g., the search results 606) to analyze each individual listing title of the item inventory (e.g., listing title 608) and determine a preferred pairwise order of the set of tokens.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIG. 2 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the described systems and methods in different contexts from the disclosure contained herein.

Software Architecture

Figure 7:
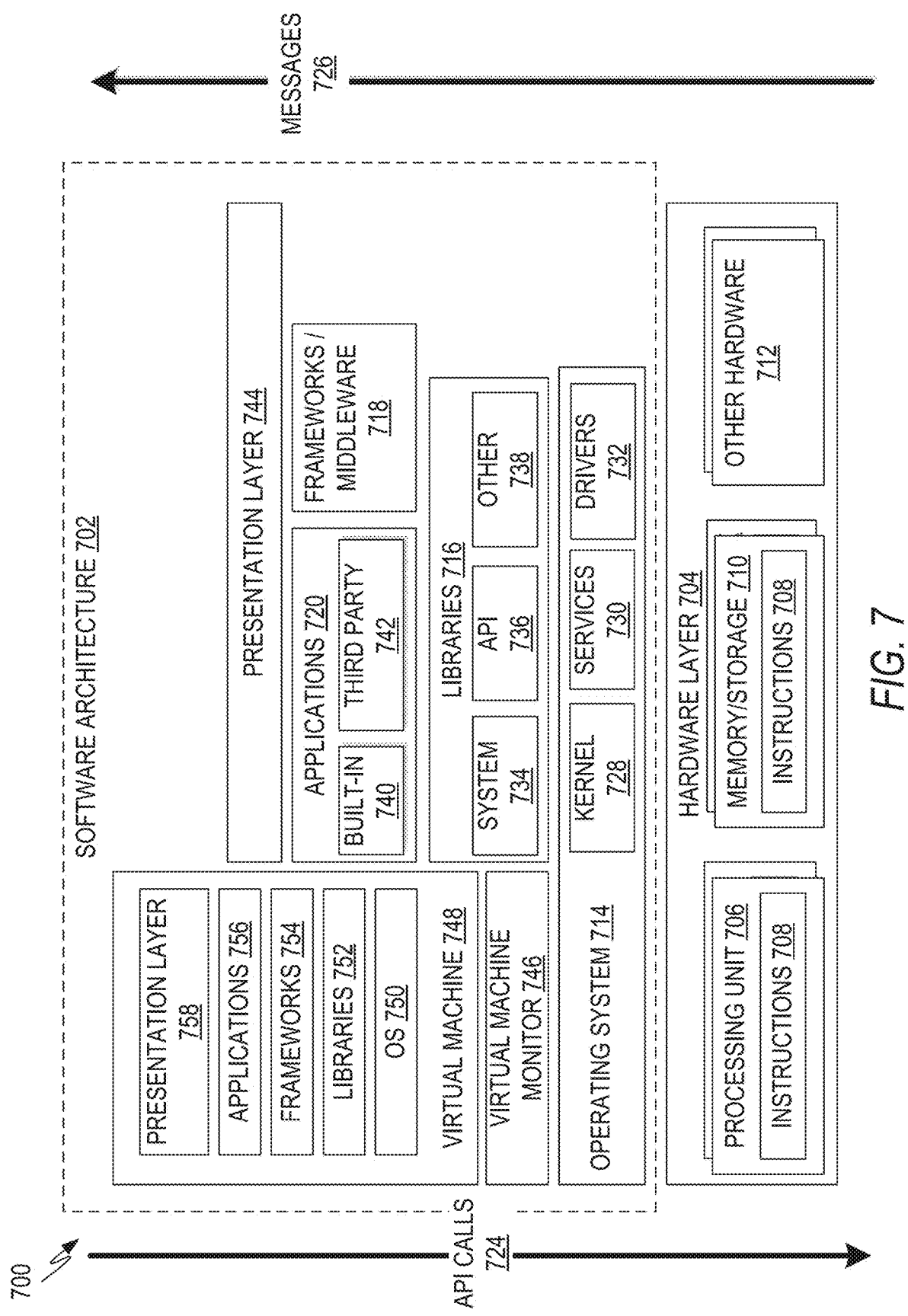
FIG. 7 is a block diagram illustrating an example of a software architecture that may be installed on a machine, according to some example embodiments.

FIG. 7 is a block diagram 700 illustrating a representative software architecture 702, which may be used in conjunction with various hardware architectures herein described. FIG. 7 is merely a non-limiting example of a software architecture and it will be appreciated that many other architectures may be implemented to facilitate the functionality described herein. The software architecture 702 may be executing on hardware such as machine 800 of FIG. 8 that includes, among other things, processors 810, memory 830, and I/O components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methods, modules and so forth of FIG. 2. Hardware layer 704 also includes memory and/or storage modules 710, which also have executable instructions 708. Hardware layer 704 may also comprise other hardware as indicated by 712 which represents any other hardware of the hardware layer 704, such as the other hardware illustrated as part of machine 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720 and presentation layer 722. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 includes built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine of FIG. 8, for example). A virtual machine is hosted by a host operating system (operating system 714 in FIG. 8) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 758. These layers of software architecture executing within the virtual machine 748 can be the same as corresponding layers previously described or may be different.

Example Machine Architecture and Machine-Readable Medium

Figure 8:
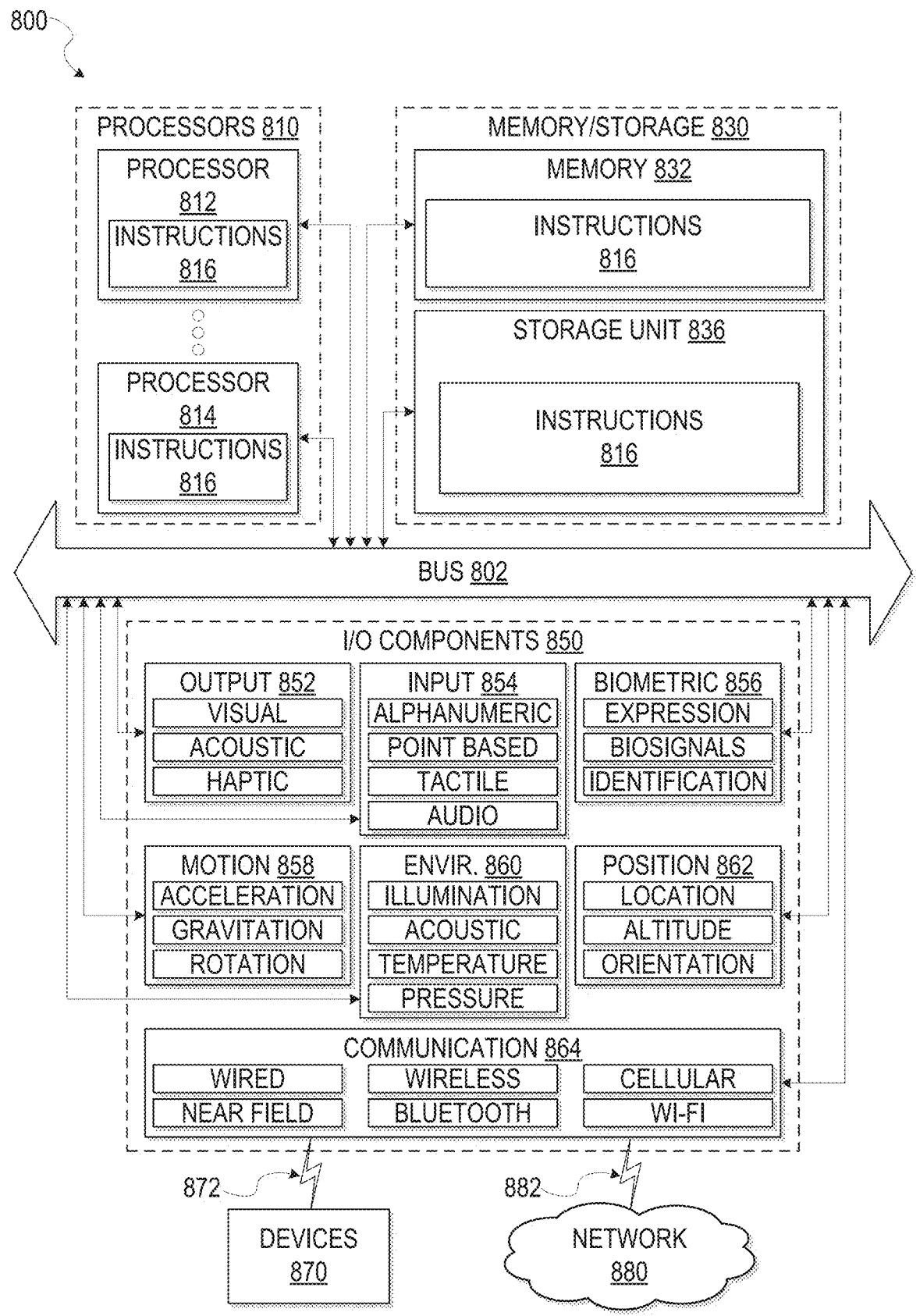
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions may cause the machine to execute the flow diagrams of FIGS. 3-5. Additionally, or alternatively, the instructions may implement the search module 210, the sorting module 220, the weighting module 230, the human readable title module 240, the presentation module 250 of FIG. 2, and so forth. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872, respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more hardware processors; and
   a memory comprising instructions that, when executed by the one or more processors, causes the one or more hardware processors to perform operations comprising:
   receiving from a client device, by a processor from among the one or more hardware processors, a search query that comprises a set of tokens, the set of tokens defining individual words of the search query;
   retrieving a set of item listings from an item inventory based on the search query, each item listing from the item inventory including a listing title that includes at least a pair of tokens from among the set of tokens of the search query;
   determining a pairwise order of the pair of tokens from among the set of tokens, the pairwise order defining a sequence of the pair of tokens;
   generating a page title based on the pairwise order of the pair of tokens; and
   causing display of a presentation of the set of item listings at the client device, the presentation of the set of item listings including a display of the page title at a position within the presentation of the set of item listings.

2. The system of claim 1, wherein the operations further comprise:
   determining a first weight of a first listing title that includes the pair of tokens;
   assigning the first weight of the first listing title to a first sequence of the pair of tokens in the first item listing;
   determining a second weight of a second listing title that includes the pair of tokens;
   assigning the second weight of the second listing title to a second sequence of the pair of tokens in the second item listing;
   assigning the first weight a positive sign;
   assigning the second weight a negative sign;
   calculating a sum of the first weight and the second weight;
   determining a sign of the sum; and
   selecting the pairwise order based on the sign of the sum.

3. The system of claim 2, wherein the first weight and the second weight are determined based on a view count of a first item listing and a second item listing.

4. The system of claim 2, wherein the first weight and the second weight are determined based on a seller rating associated with a first item listing and a second item listing.

5. The system of claim 2, wherein the first weight and the second weight are determined based on a sales volume associated with a first item listing and a second item listing.

6. A method comprising:
   receiving, from a client device, a search query that comprises a set of tokens, the set of tokens defining individual words of the search query;
   retrieving a set of item listings from an item inventory based on the search query, each item listing from the item inventory including a listing title that includes at least a pair of tokens from among the set of tokens of the search query;
   determining a pairwise order of the pair of tokens from among the set of tokens;
   generating a page title based on the pairwise order of the pair of tokens; and
   causing display of a presentation of the set of item listings at the client device, the presentation of the set of item listings including a display of the page title at a position within the presentation of the set of item listings.

7. The method of claim 6, wherein the determining the pairwise order includes:
   determining a first weight of a first listing title that includes the pair of tokens of a first item listing from among the item inventory;
   assigning the first weight of the first listing title to a first sequence of the pair of tokens;
   determining a second weight of a second listing title that includes the pair of tokens of a second item listing from among the item inventory;
   assigning the second weight of the second listing title to a second sequence of the pair of tokens;
   assigning the first weight a positive sign;
   assigning the second weight a negative sign;
   calculating a sum of the first weight and the second weight;
   determining a sign of the sum; and
   selecting the pairwise order based on the sign of the sum.

8. The method of claim 7, wherein the first weight of the first item listing and the second weight of the second item listing are based on a view count.

9. The method of claim 7, wherein the first weight of the first item listing and the second weight of the second item listing are based on a seller rating.

10. The method of claim 7, wherein the first weight of the first item listing and the second weight of the second item listing are based on a sales volume.

11. The method of claim 6, wherein the receiving the search query further comprises:
    receiving one or more selections of attribute filters, the attribute filters comprising at least some of the set of tokens.

12. A non-transitory machine-readable storage medium storing instructions that, when executed by one or more processors of a machine, cause the machine to perform operations comprising:

receiving, from a client device, a search query that comprises a set of tokens, the set of tokens defining individual words of the search query;

retrieving a set of item listings from an item inventory based on the search query, each item listing from the item inventory including a listing title that includes at least a pair of tokens from among the set of tokens of the search query;

determining a pairwise order of the pair of tokens from among the set of tokens;

generating a page title based on the pairwise order of the pair of tokens; and causing display of a presentation of the set of item listings at the client device, the presentation of the set of item listings including a display of the page title at a position within the presentation of the set of item listings.

13. The non-transitory machine-readable storage medium of claim 12, wherein the determining the pairwise order further comprises:

determining a first weight of a first listing title that includes the pair of tokens, assigning the first weight of the first listing title to a first sequence of the pair of tokens;

determining a second weight of a second listing title that includes the pair of tokens assigning the second weight of the second listing title to a second sequence of the pair of tokens;

assigning the first weight a positive sign;

assigning the second weight a negative sign;

calculating a sum of the first weight and the second weight;

determining a sign of the sum; and selecting the pairwise order based on the sign of the sum.

14. The non-transitory machine-readable storage medium of claim 13, wherein the first weight of the first item listing and the second weight of the second item listing are based on a view count.

15. The non-transitory machine-readable storage medium of claim 13, wherein the first weight of the first item listing and the second weight of the second item listing are based on a reputation score of an author.

16. The non-transitory machine-readable storage medium of claim 13, wherein the first weight of the first item listing and the second weight of the second item listing are based on a sales volume.

* * * * *